(12) United States Patent
Tamai et al.

(10) Patent No.: US 8,825,283 B2
(45) Date of Patent: Sep. 2, 2014

(54) ELECTRIC-DRIVE TRACTABILITY INDICATOR INTEGRATED IN HYBRID ELECTRIC VEHICLE TACHOMETER

(75) Inventors: Goro Tamai, West Bloomfield, MI (US); Jing Zhou, Auburn Hills, MI (US); Feisel Weslati, Troy, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 97 days.

(21) Appl. No.: 13/593,589

(22) Filed: Aug. 24, 2012

(65) Prior Publication Data

US 2013/0218406 A1 Aug. 22, 2013

Related U.S. Application Data

(60) Provisional application No. 61/536,173, filed on Sep. 19, 2011.

(51) Int. Cl.
*G06F 19/10* (2011.01)
*B60Q 1/00* (2006.01)

(52) U.S. Cl.
USPC .......................... 701/34.4; 340/461

(58) Field of Classification Search
CPC ................. B60K 35/00; G01P 3/44
USPC .......................... 701/34.4; 340/461
See application file for complete search history.

(56) References Cited

U.S. PATENT DOCUMENTS

| | | | |
|---|---|---|---|
| 7,710,252 B2 * | 5/2010 | Kaya | 340/459 |
| 2008/0042821 A1 | 2/2008 | Kaya | |
| 2009/0243827 A1 | 10/2009 | Burke et al. | |

FOREIGN PATENT DOCUMENTS

| | | | |
|---|---|---|---|
| DE | 102010047980 A1 * | 6/2011 | |
| DE | 102010010446 A1 | 8/2011 | |
| EP | 2070787 A1 | 6/2009 | |

OTHER PUBLICATIONS

International Search Report dated Mar. 13, 2013 for International Application No. PCT/US2012/054798, International Filing Date Sep. 12, 2012.
Written Opinion dated Mar. 13, 2013 for International Application No. PCT/US2012/054798, International Filing Date Sep. 12, 2012.

* cited by examiner

*Primary Examiner* — Calvin Cheung
*Assistant Examiner* — Aaron L Troost
(74) *Attorney, Agent, or Firm* — Ralph E Smith

(57) ABSTRACT

An indicator, system and method of indicating electric drive usability in a hybrid electric vehicle. A tachometer is used that includes a display having an all-electric drive portion and a hybrid drive portion. The all-electric drive portion and the hybrid drive portion share a first boundary which indicates a minimum electric drive usability and a beginning of hybrid drive operation of the vehicle. The indicated level of electric drive usability is derived from at least one of a percent battery discharge, a percent maximum torque provided by the electric drive, and a percent electric drive to hybrid drive operating cost for the hybrid electric vehicle.

13 Claims, 3 Drawing Sheets

ELECTRIC-DRIVE TRACTABILITY INDICATOR INTEGRATED IN HYBRID ELECTRIC VEHICLE TACHOMETER

CROSS-REFERENCE TO RELATED APPLICATIONS

This application claims the benefit of U.S. Provisional Ser. No. 61/536,173, filed Sep. 19, 2011.

GOVERNMENT INTEREST

This invention was made, at least in part, under U.S. Government, Department of Energy, Contract Nos. DE-EE0002720 and DE-EE0004529. The Government may have rights in this invention.

FIELD

The present disclosure relates to a system and method for displaying vehicle information, and more particularly to a system and method for displaying vehicle information relating to operation with both a gas-powered engine and electric motors in a hybrid electric vehicle.

BACKGROUND

Automotive vehicles generally include a number of gauges, indicators and various other displays that are designed to provide the vehicle user with information pertaining to the operation of the vehicle. Among the gauges, indicators and displays included in a vehicle are those that indicate speed, distance traveled, distance to be traveled before a refueling must occur, fuel status, temperature, and various warning and/or alert conditions. Whenever new technologies are incorporated into the vehicle, additional or new indicators may be desired or needed. For example, while a display that indicates engine speed (in terms of revolutions per minute or "rpm") is often used in vehicles that include gas-powered engines, the same indicator may not be useful in a vehicle that does not include a gas-powered engine (such as a vehicle with only an electric motor). In a vehicle with only an electric motor, the motor output power is indicated in reference to a parameter other than engine rpm. Hybrid electric vehicles, which may require displays indicating operation of both electric motors and a gas-powered engine, require additional innovations in order to present useful information in a way that does not overwhelm the user but is instead useful to the vehicle user.

SUMMARY

In one form, the present disclosure provides an indicator of electric drive usability in a hybrid electric vehicle. The indicator includes a tachometer with a display having an all-electric drive portion and a hybrid drive portion. The all-electric drive portion and the hybrid drive portion share a first boundary which indicates a minimum electric drive usability and a beginning of hybrid drive operation of the vehicle. The indicated level of electric drive usability is derived from at least one of a percent battery discharge, a percent maximum torque provided by the electric drive, and a percent electric drive to hybrid drive operating cost for the hybrid electric vehicle.

In another form, the present disclosure provides a system for indicating electric drive usability in a hybrid electric vehicle. The system includes a processor and at least one sensor input coupled to the processor. The system also includes a tachometer coupled to an output of the processor. The tachometer includes a display having an all-electric drive portion and a hybrid drive portion. The all-electric drive portion and the hybrid drive portion share a first boundary which indicates a minimum electric drive usability and a beginning of hybrid drive operation of the vehicle. The indicated level of electric drive usability is derived from at least one of a percent battery discharge, a percent maximum torque provided by the electric drive, and a percent electric drive to hybrid drive operating cost for the hybrid electric vehicle.

In a further form, the present disclosure provides a method of indicating electric drive usability in a hybrid electric vehicle. The method includes the step of determining at least one of a percent battery discharge, a percent maximum torque provided by the electric drive, and a percent electric drive to hybrid drive operating cost for the hybrid electric vehicle. The method also includes the step of displaying a level of electric drive usability on an all-electric drive portion of a tachometer. The displayed level of electric drive usability is derived from the determined percentages. The all-electric drive portion of the tachometer shares a first boundary with a hybrid drive portion of the tachometer. The first boundary indicates a minimum electric drive usability and a beginning of hybrid drive operation of the vehicle.

Further areas of applicability of the present disclosure will become apparent from the detailed description, drawings and claims provided hereinafter. It should be understood that the detailed description, including disclosed embodiments and drawings, are merely exemplary in nature, intended for purposes of illustration only, and are not intended to limit the scope of the invention, its application, or use. Thus, variations that do not depart from the gist of the invention are intended to be within the scope of the invention.

DETAILED DESCRIPTION

Figure 1:
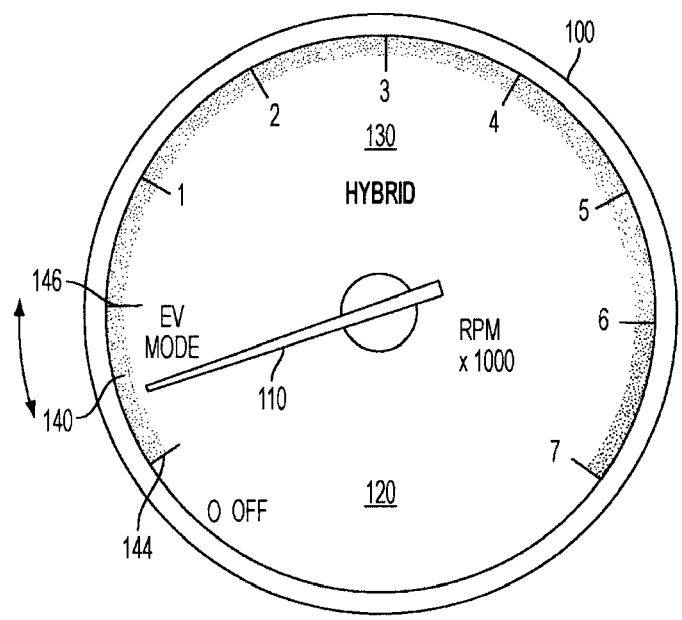
FIG. 1 is a tachometer for a hybrid electric vehicle according to the principles of the present disclosure.

FIG. 1 illustrates an improved tachometer 100 for use in a hybrid electric vehicle, in accordance with a disclosed embodiment of the invention. The tachometer 100 includes a needle 110 that pivots around the center of a dial indicator 120. The needle 110 may be a physical needle or may be a representation of a needle made of a laser or of light-producing elements. The dial indicator 120 includes a hybrid drive portion 130 along the circumference of the dial that indicates the power output of a gas-powered engine in terms of revolutions per minute. The dial indicator 120 also includes an all-electric drive portion 140 that relates the operation of electric motors during electric vehicle mode to the operation of the gas-powered engine. When the vehicle is operating in the electric vehicle mode, the needle points to the all-electric drive portion 140 of the tachometer 100. When the vehicle is operating in the hybrid vehicle mode, the needle points to the hybrid drive portion 130 of the tachometer relating to the output of the gas-powered engine.

The all-electric drive portion 140 of the tachometer 100 indicates the degree to which the electric motor may be used before the vehicle reverts to using the vehicle's gas-powered engine. The lower boundary 144 of the all-electric drive portion corresponds to the situation when the battery is maximally charged, the driver-requested propulsion power is at a minimum level, and the operating cost ratio of operating the electric drive versus operating the hybrid drive is at a minimum. The upper bound 146 of the all-electric drive portion 140 corresponds to the threshold at which the engine is about to start due to a low battery state of charge ("SOC"), a high drive torque request, or electric drive operating costs that are higher than hybrid drive operating costs, among other reasons.

The position of the needle 110 within the all-electric drive portion 140 of the tachometer 100 is dependent upon several factors. One factor is the charge state of the battery. A fully charged battery means that there is more power available to be output during the electric vehicle mode. Therefore, a fully charged battery will result in the needle 110 being closer to the lower boundary 144 of the all-electric drive portion 140 of the display 120. The more the battery is discharged, the more the needle 110 approaches the upper boundary 146 of the all-electric drive portion 140 of the display 120.

Another factor that affects the position of the needle 110 within the all-electric drive portion 140 of the tachometer 100 is the amount of torque to be provided by the vehicle's drivetrain at a given moment in time. The amount of vehicle torque needed is related to the degree of acceleration desired of the vehicle, the vehicle's load, and/or the amount of force required to overcome counteracting forces acting on the vehicle. For example, if the driver of the vehicle desires a quick acceleration, more torque is required of the drivetrain. An increased load on the vehicle can also result in an increased torque requirement. Additionally, an uphill-moving vehicle requires an elevated amount of drivetrain torque to overcome the opposing force of gravity. In each case, increasing the torque required from the drivetrain during electric vehicle mode affects the position of the tachometer needle 110 within the all-electric drive portion 140 of the tachometer 100. A low torque requirement favors a needle position near the lower boundary 144 of the all-electric drive portion 140. A high torque requirement that is less than a maximum torque provided by the electric motor favors a needle position that approaches the upper boundary 146 of the all-electric drive portion 140. A torque requirement that exceeds the maximum torque allowed by the high-voltage battery results in the operation of the gas-powered engine in addition to the electric motor and the tachometer needle 110 moves into the hybrid drive portion 130 of the display 120.

Needle position is also influenced by various operating costs of the powertrain. For example, the operation of the vehicle's powertrain at a given speed and temperature results in specific operating costs. The specific operating costs may vary based on whether the vehicle is using its electric motor or its gas-powered engine. Factors that influence the operating costs include vehicle driveability, fuel economy, emissions, and battery usage. For example, low operating costs are generally associated with lower fuel consumption at high conversion efficiencies, lower battery power usage, and lower emissions for various engine speed/load operating points. Therefore, the position of the tachometer needle 110 within the all-electric drive portion 140 of the display 120 is related to a comparison of the drivetrain operating costs arising from use of the electric motor at given conditions with the drivetrain operating costs arising from use of the gas-powered engine at the same conditions. A low ratio (meaning that the electric motor operating costs are lower than the gas-powered engine operating costs) favors a needle position near the lower boundary 144 of the all-electric drive portion 140 of the display 120. A high ratio that is still less than one favors a needle position near the upper boundary 146 of the all-electric drive portion 140 of the display 120. A ratio greater than one means that the drivetrain operating costs are lower for operation of the gas-powered engine than for the electric motor, and therefore the vehicle will use the gas-powered engine and the tachometer needle 110 will be positioned in the gas-powered engine or hybrid drive portion 130 of the display 120.

Other factors may be considered in determining the position of the tachometer needle 110 within the all-electric drive portion 140 of the tachometer 100. For example, braking events or other changes in vehicle behavior may influence the needle position.

The relative strength of each factor influencing the tachometer needle position within the all-electric drive portion 140 of the display 120 may be assessed and combined to determine an overall needle position within electric mode operation of the vehicle.

Figure 2:
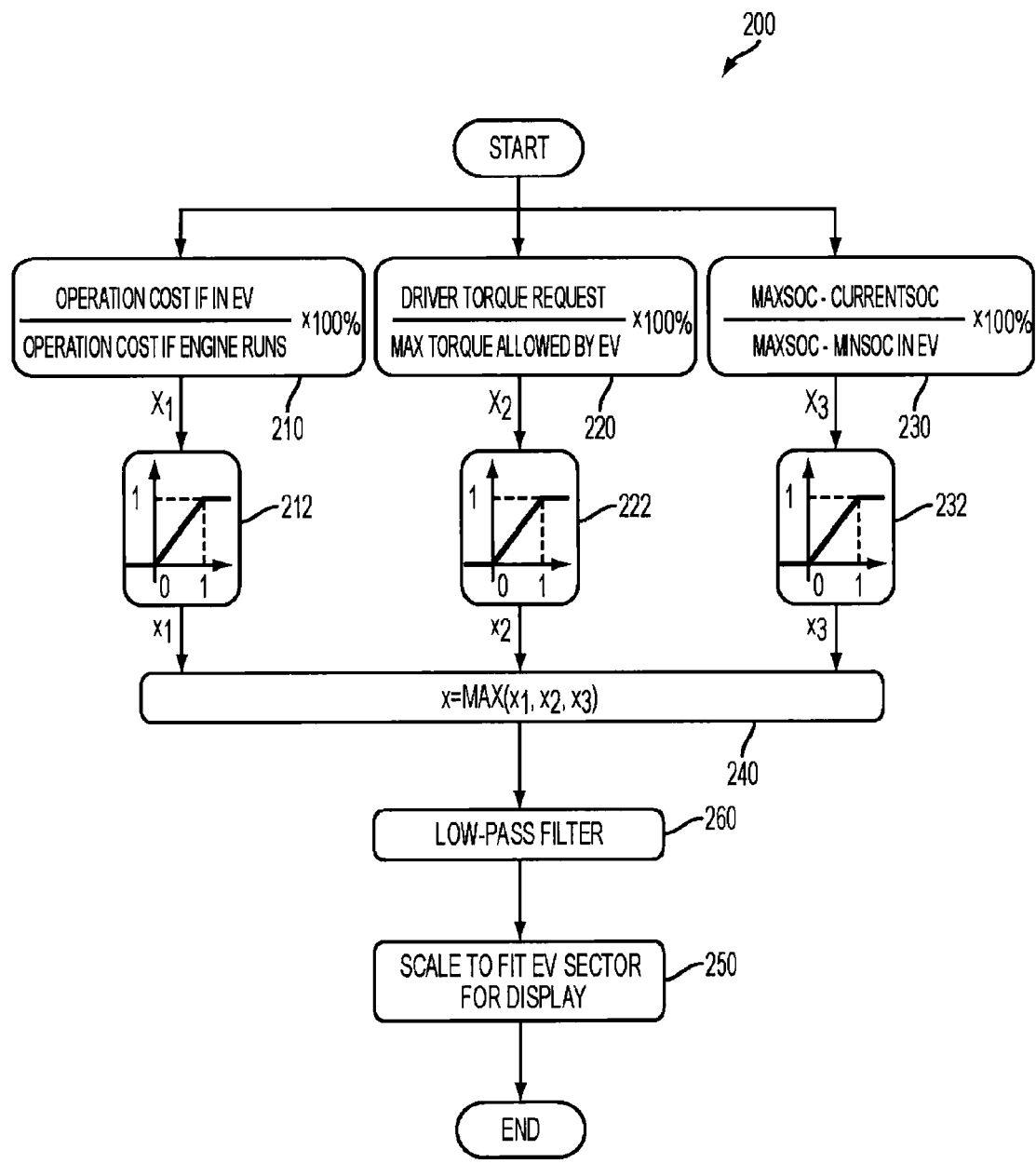
FIG. 2 is a method of indicating electric drive usability in a hybrid electric vehicle according to the principles of the present disclosure.

FIG. 2 illustrates a method 200 of determining the tachometer needle position within the all-electric drive portion 140 of the display 120 of FIG. 1. The method 200 of FIG. 2 is repeated continuously or at given intervals so that the tachometer needle 110 is regularly updated. Ideally, the method 200 is repeated at a fast enough rate so as to result in smooth and timely motion of the tachometer needle 110.

The method 200 begins by determining strengths of various factors that affect the position of the needle 110. The method 200 illustrates three separate modules 210, 220, 230, each for determining the strength of a different factor. Additional modules could be included as well.

The operating costs module 210 determines the comparative costs of operating the vehicle's drivetrain using either the electric motor alone or the gas-powered engine along with the electric motor. To determine the strength of this factor, the module 210 determines the drivetrain operation costs for the given conditions for the vehicle in both the electric vehicle mode and the gas-powered mode. The value of the operation costs for each mode and for given conditions may be stored in a lookup table or in some other accessible format. The module 210 determines a ratio of the drivetrain operation costs in the electric mode to the drivetrain operation costs in the gas-powered mode, and then converts the ratio to a percentage. A percentage close to 0% indicates that drivetrain operation costs in the electric mode are much less than the drivetrain operation costs in the gas-powered mode. A percentage close to but less than 100% indicates that the drivetrain operation costs in the electric mode are only slightly less than the drivetrain operation costs in the gas-powered mode. A percentage equal to or greater than 100% indicates that the electric mode drivetrain operation costs are equal to or greater than the drivetrain operation costs of the gas-powered mode.

In the vehicle torque module 220, a comparison is made between the amount of torque required of the vehicle versus the maximum amount of torque for which the electric motor and the high-voltage battery is rated to supply. To determine the strength of this factor, module 220 determines a value for the torque required by the driver (input as signals from, for example, the depression of the gas pedal at an instantaneous vehicle speed) and divides this value by the maximum torque allowed by the electric motor and the battery. The maximum torque allowed by the electric motor is continuously updated given the rotational speed of the motor, device temperature, battery state-of-charge, etc. The result of this comparison is converted to a percentage. A percentage less than 100% indicates that the required torque is less than the maximum allowed torque in the electric mode, while a percentage equal to or greater than 100% indicates that the gas-powered engine should be used to provide the required torque.

A battery state-of-charge ("SOC") module 230 determines the percentage of battery capacity that has been spent. Thus, a value of 100% indicates that the vehicle battery has been depleted to the level that the engine has to start to charge the battery. A value of 0% indicates that the vehicle battery is fully charged.

Each of the modules 210, 220, 230 outputs a percentage $X_1$, $X_2$, $X_3$. The output percentages $X_1$, $X_2$, $X_3$ are passed through saturation modules 212, 222, 232, respectively, that effectively cap or scale the output percentages $X_1$, $X_2$, $X_3$ to a maximum of 100%. Any output percentages $X_1$, $X_2$, $X_3$ that are greater 100% are reduced to 100% by the saturation modules 212, 222, 232. Other saturation modules may be used. The capped output percentages $x_1$, $x_2$, $x_3$ are then compared by a comparing module 240 to determine the value x of the highest capped output percentage $X_1$, $X_2$, $X_3$. The highest compared value x is the percentage used to determine the position of the tachometer needle 110 within the all-electric drive portion 140 of the display 120. A value of 0% indicates that the needle 110 will point towards the lower boundary 144 of the all-electric drive portion 140. A value of 100% indicates that the vehicle should not be operating in the electric vehicle mode and should instead engage the gas-powered engine immediately. Percentages in between 0 and 100 are scaled to fit within and are displayed by the needle 110 in the all-electric drive portion 140 of the tachometer 100 (module 250).

Because data from the method is output on a continuous basis, and to avoid jerky or noisy movement of the tachometer needle, a low pass filter module 260 is used to smooth the outputs x arising from the comparing module 240.

Figure 3:
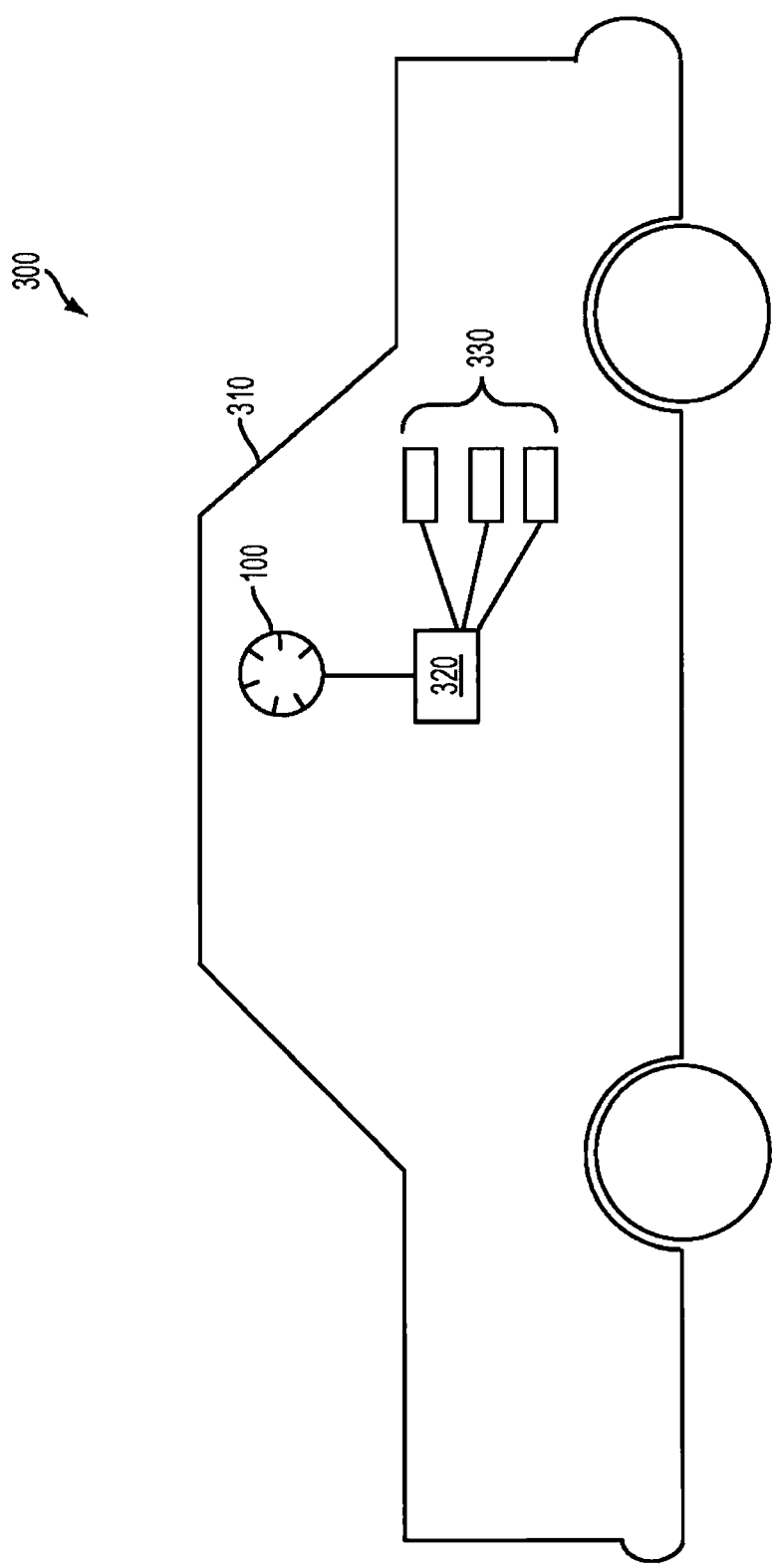
FIG. 3 is a processor system for indicating electric drive usability in a hybrid electric vehicle according to the principles of the present disclosure.

The tachometer 100 and method 200 are implemented within system 300, illustrated in FIG. 3. FIG. 3 illustrates a vehicle 310 that includes the tachometer 100 that displays electric drive usability information using method 200. The tachometer 100 is coupled to a processor 320. The processor 320 accepts various input signals and uses the signals to determine whether the needle 110 of tachometer 100 should point to the all-electric drive portion 140 or the hybrid drive portion 130 of the display 120. The processor 320 also determines (using method 200) where within the all-electric drive portion 140 the needle 110 should point.

The input signals used by the processor 320 include signals transmitted by various sensors 330 used in the hybrid vehicle. Sensors 330 may include estimation modules for determining the state of charge of the electric motor battery, pedal-mapping look-up tables for determining applied or necessary vehicle torque, and sensors for determining various operating conditions of the vehicle's drivetrain. The sensed or estimated input signals are used by, for example, modules 210, 220, 230 in method 200.

Variations to the present disclosure may be made. For example, additional sensors may be necessary to accommodate additional or different modules used in method 200. Modules 210, 220, 230, or additional modules, may be implemented in either software or hardware. Display 120 of the tachometer 100 may also be varied. In FIG. 1, the tachometer 100 is illustrated with a circular display 120. Other shapes such as vertical or horizontal bars or other digital displays may be incorporated into the present disclosure.

The presently disclosed tachometer 100 is not only useful for indicating to a user whether a vehicle is operating in the electric or hybrid drive state, but the tachometer is also useful for educating a user in how to drive a vehicle so as to maintain vehicle operation in a given state. For example, a vehicle's driver can use the tachometer 100 as a guide for maintaining vehicle operation in the electric drive mode. The driver can monitor the position of needle 110 to ensure that it remains in the all-electric drive portion 140 of the display 120 while the driver is operating the vehicle. For example, by monitoring the needle 110, the driver can recognize that slower acceleration may allow the vehicle to remain in an electric drive mode, because faster acceleration may force the vehicle to switch into hybrid drive mode. Frequent transitions between the electric drive mode and the hybrid drive mode can result in inefficiencies in vehicle operation. Thus, a driver can learn to operate the vehicle more efficiently by changing driving habits so as to maintain the needle in the desired mode of operation.

What is claimed is:

1. An indicator of electric drive usability in a hybrid vehicle, comprising:
a tachometer that includes a display having an all-electric drive portion and a hybrid drive portion. the all-electric drive portion and the hybrid drive portion sharing a first boundary which indicates a minimum electric drive usability and a beginning of hybrid drive operation of the vehicle,
wherein electric drive usability is represented by indicating within the all-electric drive portion of the display one of percent battery discharge percent maximum torque provided by the electric drive, and percent electric drive to hybrid drive operating costs, and
wherein the all-electric drive portion of the display indicates the greater of the percent battery discharge, the percent maximum torque provided by the electric drive, and the percent electric drive to hybrid drive operating costs.

2. The indicator of claim 1, wherein the tachometer display includes endpoints defined by a second boundary of the all-electric drive portion and a second boundary of the hybrid drive portion.

3. The indicator of claim 2, wherein the all-electric drive portion of the display is calibrated so that the second boundary of the all-electric drive portion corresponds to maximum electric drive usability.

4. The indicator of claim 1, wherein the first boundary of the all-electric drive portion represents a maximum amount of battery discharge and a second boundary of the all-electric drive portion represents a minimum amount of battery discharge.

5. The indicator of claim 1, wherein the first boundary of the all-electric drive portion represents a maximum amount of torque able to be provided by the electric drive and a second boundary of the all-electric drive portion represents a minimum amount of torque able to be provided by the electric drive.

6. The indicator of claim 1, wherein the first boundary of the all-electric drive portion represents equal electric drive and hybrid drive operating costs and a second boundary of the all-electric drive portion represents a minimum ratio of electric drive to hybrid drive operating costs.

7. A system for indicating electric drive usability in a hybrid electric vehicle, the system comprising:
a processor;
at least one sensor input coupled to the processor; and
a tachometer coupled to an output of the processor and that includes a display having an all-electric drive portion and a hybrid drive portion, the all-electric drive portion and the hybrid drive portion sharing a first boundary which indicates a minimum electric drive usability and a beginning of hybrid drive operation of the vehicle, wherein the at least one sensor input includes at least one of a sensor used in determining battery charge status, a sensor used in determining an amount of torque requested of the electric drive, and a sensor used in determining electric drive and hybrid drive operating costs, wherein the processor is configured to determine at least one of percent battery discharge, percent maximum torque provided by the electric drive, and percent electric drive to hybrid drive operating costs based on the sensor inputs, and wherein the processor is configured to output a signal to the tachometer representing the greater of the determined at least one of the percent battery discharge, the percent maximum torque provided by the electric drive, and the percent electric drive to hybrid drive operating costs.

8. The system of claim 7, wherein the output signal is represented on the all-electric drive portion of the display to indicate a level of electric drive usability between the minimum electric drive usability at the first boundary and a maximum electric drive usability at a second boundary of the all-electric drive portion.

9. The system of claim 8, wherein the first boundary of the all-electric drive portion represents a maximum amount of battery discharge and a second boundary of the all-electric drive portion represents a minimum amount of battery discharge.

10. The system of claim 8, wherein the first boundary of the all-electric drive portion represents a maximum amount of torque able to be provided by the electric drive and a second boundary of the all-electric drive portion represents a minimum amount of torque able to be provided by the electric drive.

11. The system of claim 8, wherein the first boundary of the all-electric drive portion represents equal electric drive and hybrid drive operating costs and a second boundary of the all-electric drive portion represents a minimum ratio of electric drive to hybrid drive operating costs.

12. A method of indicating electric drive usability in a hybrid electric vehicle, the method comprising:

determining, by a computer processor, at least one of a percent battery discharge, a percent maximum torque provided by the electric drive, and a percent electric drive to hybrid drive operating cost for the hybrid electric vehicle;

displaying a level of electric drive usability on an all-electric drive portion of a tachometer, wherein the level of electric drive usability is derived from the determined at least one percentages, the all-electric drive portion of the tachometer sharing a first boundary with a hybrid drive portion of the tachometer, the first boundary indicating a minimum electric drive usability and a beginning of hybrid drive operation of the vehicle; and calibrating the all-electric drive portion of the display so that a second boundary of the all-electric drive portion corresponds to maximum electric drive usability, wherein displaying a level of electric drive usability includes indicating within the all-electric drive portion of the display the greater of the percent battery discharge, the percent maximum torque provided by the electric drive, and the percent electric drive to hybrid drive operating costs.

13. The method of claim 12, wherein displaying a level of electric drive usability includes indicating within the all-electric drive portion of the display only one of the percent battery discharge, the percent maximum torque provided by the electric drive, and the percent electric drive to hybrid drive operating costs.

* * * * *